United States Patent
Schmitt et al.

(10) Patent No.: US 6,709,067 B1
(45) Date of Patent: Mar. 23, 2004

(54) METHOD AND DEVICE FOR RUGULATING THE BRAKING MOMENT OF A BRAKING FORCE REGULATOR ON AT LEAST ONE WHEEL OF A MOTOR VEHICLE

(75) Inventors: Johannes Schmitt, Markgroeningen (DE); Andreas Zoebele, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/913,254

(22) PCT Filed: Oct. 17, 2000

(86) PCT No.: PCT/DE00/03644

§ 371 (c)(1), (2), (4) Date: Dec. 17, 2001

(87) PCT Pub. No.: WO01/42068

PCT Pub. Date: Jun. 14, 2001

(30) Foreign Application Priority Data

Dec. 10, 1999 (DE) .......................... 199 59 706

(51) Int. Cl.⁷ .................. B60T 13/18; B60T 13/66
(52) U.S. Cl. ............... 303/11; 303/DIG. 2; 303/20
(58) Field of Search ................ 303/11, 20, 156, 303/157, 166, 167, 168, 112, 113.1, 115.4, 116.1, DIG. 1, DIG. 2

(56) References Cited

U.S. PATENT DOCUMENTS

| | | | | | |
|---|---|---|---|---|---|
| 4,989,925 | A | * | 2/1991 | Kohno | 303/116.2 |
| 5,188,440 | A | * | 2/1993 | Muller et al. | 303/116.2 |
| 5,295,737 | A | * | 3/1994 | Epple et al. | 303/11 |
| 5,419,622 | A | * | 5/1995 | Burg et al. | 303/139 |
| 5,454,632 | A | * | 10/1995 | Burgdorf et al. | 303/115.4 |
| 5,711,582 | A | * | 1/1998 | Koike | 303/11 |
| 6,076,897 | A | * | 6/2000 | Binder et al. | 303/116.1 |
| 6,076,900 | A | * | 6/2000 | Jung et al. | 303/156 |
| 6,206,488 | B1 | * | 3/2001 | Binder et al. | 303/122.04 |
| 6,241,323 | B1 | * | 6/2001 | Wagner et al. | 303/113.4 |

FOREIGN PATENT DOCUMENTS

| | | |
|---|---|---|
| DE | 37 31 075 | 3/1989 |
| DE | 39 23 599 | 2/1990 |
| DE | 196 51 154 | 6/1997 |
| DE | 19651154 A1 * | 6/1997 |
| DE | 19636432 A1 * | 3/1998 |
| WO | WO 94 18 041 | 8/1994 |
| WO | WO 97 06 038 | 2/1997 |
| WO | WO 97 29 001 | 8/1997 |

\* cited by examiner

*Primary Examiner*—Jack Lavinder
*Assistant Examiner*—Melody M. Burch
(74) *Attorney, Agent, or Firm*—Kenyon & Kenyon

(57) ABSTRACT

A method and a device for controlling the braking torque of a brake force controller at at least one wheel of a motor vehicle, in which the control pulses for a hydraulic valve is not calculated as a function of the control signal of the hydraulic pump (pump motor PM) but of the actual standstill of the pump motor PM. To detect the actual standstill of the pump motor PM, its induced voltage $\mu_{PM}$ is measured. When voltage $\mu_{PM}$ falls below a predefined minimum threshold value $V_x$, then the pump motor PM is assumed to be at a standstill.

7 Claims, 2 Drawing Sheets

METHOD AND DEVICE FOR RUGULATING THE BRAKING MOMENT OF A BRAKING FORCE REGULATOR ON AT LEAST ONE WHEEL OF A MOTOR VEHICLE

FIELD OF THE INVENTION

The present invention relates to a method and a device for controlling the braking torque of a brake force regulator at at least one wheel of a motor vehicle.

BACKGROUND INFORMATION

A method for determining the braking force at a wheel of a vehicle is described in German Patent No. 39 23 599 in which the wheel speed and the brake pressure are measured. A new parameter for the braking force at the wheel is determined from these measured quantities with the aid of a parameter estimation method.

In the case of the brake-slip controller according to German Published Patent Application No. 37 31 075, the difference between a permissible brake slip and the actual brake slip is determined. Control times for a control unit which regulates the brake pressure are determined from this difference by a control amplifier. The control is temporarily interrupted for short periods and recalculated subsequent to updating the measured parameters. In this context, it has turned out that in the calculation of the control times for the pressure valve, no consideration was made as to whether the hydraulic pump is still in operation or completely at rest subsequent to switching off the control signal. Since, when the hydraulic pump is still in operation, an increased initial pressure is present in the line system and affects the control times for the valve.

SUMMARY OF THE INVENTION

The method and the device according to the present invention for controlling the brake torque of a brake force regulator has the advantage over the background art that the control times for the valve of a wheel brake cylinder can be calculated as a function of the actual pressure which is present in the line prior to the beginning of the control. It is particularly advantageous that the standstill of the electric motor of the hydraulic pump can be detected by a simple measurement of the induced voltage.

It is particularly advantageous that the pressure in the line is measured without any additional sensor via the coasting of the hydraulic pump subsequent to switching off the control signal. This is advantageously carried out by measuring the induced voltage (e.m.f.) at the field winding of the pump motor.

In this context, to determine the standstill of the hydraulic pump, it is advantageously assumed that the pressure in the hydraulic system has largely dropped when the measured voltage lies below a predefined limit value. In this manner, the waiting times until the standstill of the hydraulic pump are prevented from becoming excessively long. In this manner, one also succeeds in increasing the brake pressure in the system in a pulsed manner without all too long time intervals. This advantageously results in that the wheel is braked with a controlled slip, thus attaining optimum deceleration values of the vehicle.

DETAILED DESCRIPTION

Figure 1:
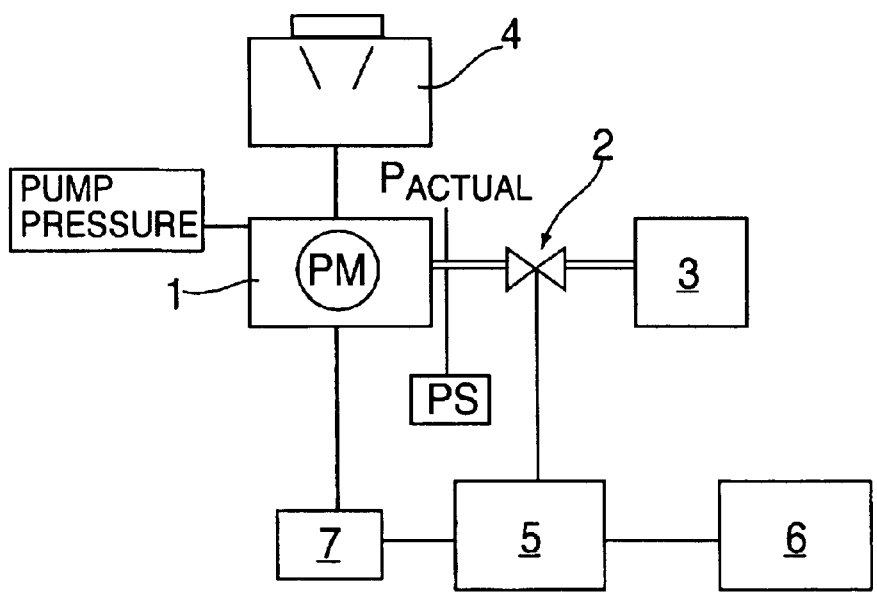
FIG. 1 shows a block diagram.

FIG. 1 shows a block diagram in simplified form featuring a hydraulic pump 1 which is driven by an electrically powered pump motor PM. On the hydraulic side, the hydraulic pump is connected to a reservoir 4 in which an appropriate reserve of hydraulic oil is stored. On the output side, hydraulic pump 1 is connected to a wheel brake cylinder 3 via a valve 2. In FIG. 1, the hydraulic lines are indicated with a double line for reasons of understanding. This scheme can, of course, be alternatively used for compressed air operated brakes as well.

On the electrical side, a voltmeter 7 is connected to pump motor PM which measures the induced voltage (e.m.f.) of pump motor PM and transmits this value to a control unit 5. Moreover, control unit 5 is connected to a speed sensor 6 which measures, for example, the speed of the respective wheel. Not drawn in FIG. 1 is the pressure sensing of the instantaneous pressure in hydraulic line $P_{actual}$. In lieu of voltmeter 7 and speed sensor 6, the respective signals can, of course, also be taken from an already exactualing device. These devices are known per se and need not be further explained.

A device PS, illustrated in FIG. 1, may be provided for measuring a pump pressure.

Control unit 5 calculates the control times for valve 2 from the measured data and determines the point of time at which pump motor PM of the hydraulic pump is to be energized or de-energized for building up the pressure. In the following, the mode of operation will be explained in greater detail with reference to FIGS. 2 and 3.

During the control of the braking torque, the brake pressure in wheel brake cylinder 3 is adjusted, for example, via constant pressure stages. This is carried out by actuating valve 2 with individual pulses until the setpoint pressure is reached. During the adjustment of constant pressure steps, the control times for valve 2 depend on whether hydraulic pump 1 is already running at the beginning of the control cycle or whether it still has to start up, that is whether the pressure build-up from zero to the intended value has taken place. In this case, the first valve control pulses are calculated with a different time ratio than after the start-up of hydraulic pump 1 within the pressure control.

A similar problem arises when the pump is de-energized at the end of the control. Because of inertia, hydraulic pump 1 does not come to a standstill immediately but continues to coast over a certain time a result of which the pressure in the hydraulic line continues to be maintained. If a new pulse for controlling valve 2 occurs within the time span from the de-energizing of hydraulic pump 1 until the actual standstill of the pump motor, then the pressure in the hydraulic line has not yet dropped at this point of time so that the pulse time needs to be shortened. Therefore, it is proposed according to the present invention to detect the actual standstill of hydraulic pump 1. This is carried out by voltmeter 7 which measures the e.m.f. voltage at pump motor PM. When this voltage falls below a predefined threshold value $u_{PM}$, illustrated in FIG. 2e, it can then be assumed that the pump motor is at rest and that the pressure has been reduced.

Figure 2A:
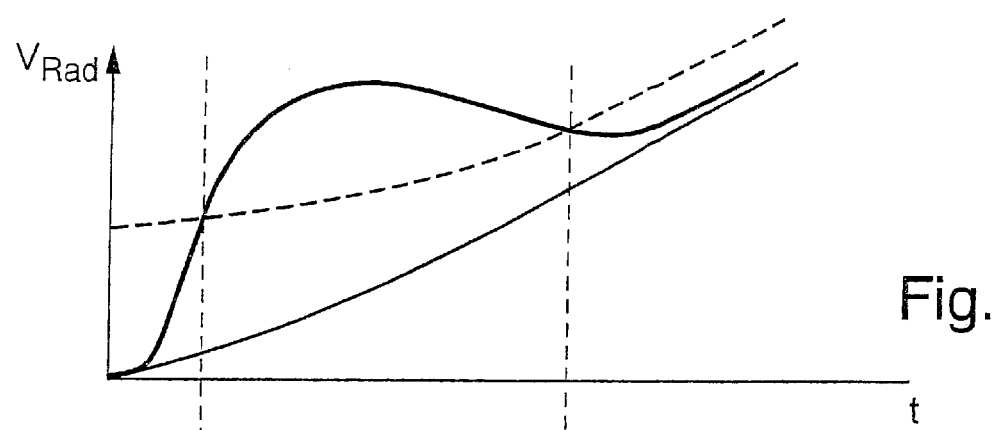
FIG. 2a shows a first diagram exhibiting a control curve.

FIGS. 2a through 2f shows different diagrams exhibiting control curves which will be explained in detail in the following. In this context, the X-axis corresponds to time axis t and the measured or calculated parameters are plotted on the Y-axis. In FIG. 2a, the Y-axis corresponds to wheel speed $V_{rad}$. The curve arching upward exemplarily corresponds to the velocity behavior of a drive wheel which has a corresponding slip. Compared with that, the lower curve represents the vehicular speed or the speed of a non-driven wheel without slip. The broken line symbolizes the average value of the speed of the drive wheel.

Figure 2B:
FIG. 2b shows a second diagram exhibiting a control curve.

In FIG. 2b, now, the positive system deviation of speed $\Delta V_{RAD}$ is shown which ensues from the velocity behavior of the drive wheel with the average value according to FIG. 2a. In this context, the positive system deviation signifies that an acceleration exactuals.

Figure 2C:
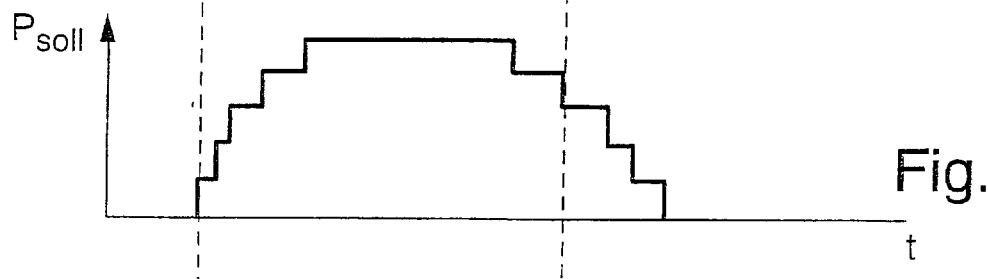
FIG. 2c shows a third diagram exhibiting a control curve.
Figure 2D:
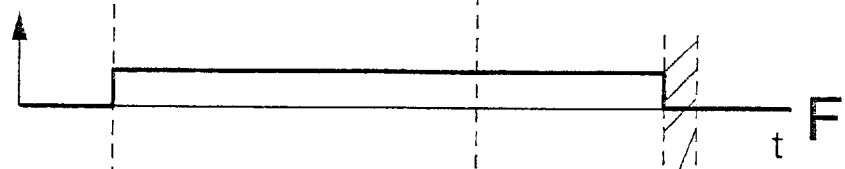
FIG. 2d shows a fourth diagram exhibiting a control curve.
Figure 2E:
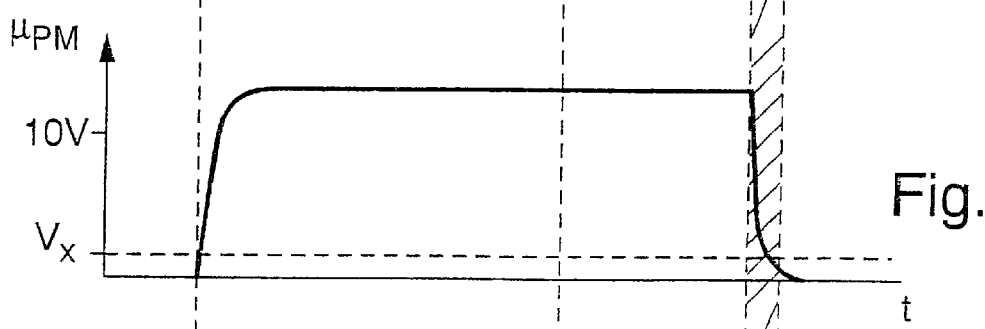
FIG. 2e shows a fifth diagram exhibiting a control curve.

FIG. 2c depicts the shape of a pressure curve for setpoint pressure $P_{setpoint}$, the pressure curve having been modulated stepwise in the ascent and descent. FIG. 2d shows a control signal for pump motor PM which is calculated by control unit 5 and which energizes pump motor PM at instant $t_1$ and de-energizes the pump motor at instant $t_2$. The corresponding profile of pump voltage $u_{PM}$ is plotted in FIG. 2e. At instant $t_1$, pump voltage $u_{PM}$ initially increases exponentially, is maintained constant at a predefined voltage level, and switched off at instant $t_2$. This results in a voltage drop which reaches value $V_x$ at instant $t_3$. Below this threshold value $V_x$, it is assumed that the pump motor has come to a standstill.

Figure 2F:
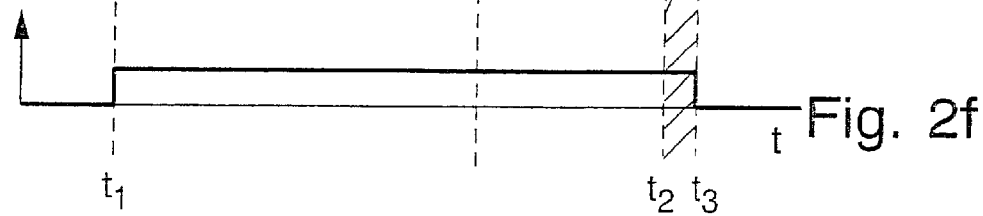
FIG. 2f shows a sixth diagram exhibiting a control curve.

According to FIG. 2f, the control duration $t_1$ through $t_3$ is shown. This control time is longer than until instant $t_2$ when the control signal for pump motor PM is switched off.

Figure 3:
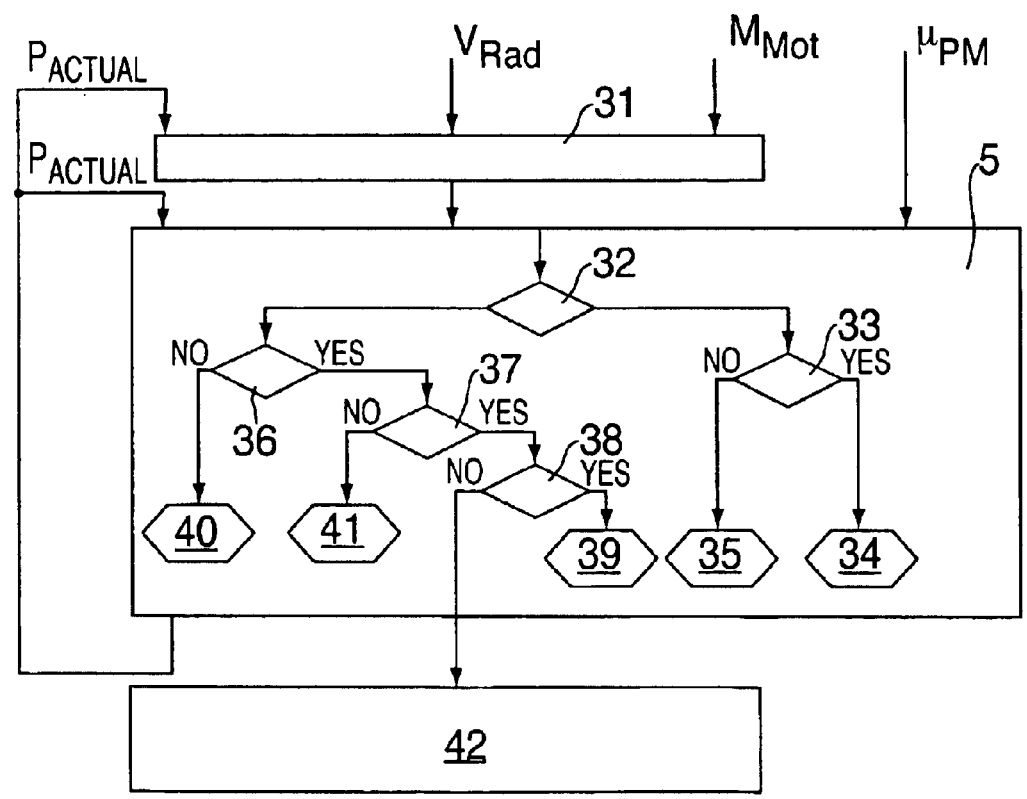
FIG. 3 shows a flow chart.

The mode of operation of the method and device according to the present invention will be explained in greater detail with reference to the flow chart of FIG. 3. Initially, at position 31, setpoint pressure $P_{setpoint}$ is calculated from the supplied signals for actual pressure $P_{actual}$, wheel speed $V_{rad}$ and motor torque Mmot. According to the exemplary embodiment, the calculation for the setpoint pressure is carried out in pressure stages. A different curve shape is also conceivable. The pressure values as well as the measured pump voltage $U_{PM}$ fed to controller 5. On the basis of a comparison between setpoint pressure $P_{setpoint}$ and actual pressure $P_{actual}$ controller 5 decides at position 32 whether a pressure build-up is required. If this is the case, it is checked at position 33 whether the control is already active. This is detected from whether the control memory is set in accordance with FIG. 2f. If this is the case, a pressure build-up takes place according to position 34 while the pump is at rest. However, if the control memory is not set, the pressure build-up is carried out at position 35 while the hydraulic pump is running.

However, if no pressure build-up was required at position 32, then it is checked at position 36 whether a pressure reduction is to be carried out. If this is not the case (position 40), then the pressure is maintained. However, if a pressure reduction is necessary, then it is checked at position 37 whether the pressure reduction is finished. If this is not the case, the pressure reduction is carried out at position 41. It is now checked at position 38 whether pump voltage $u_{PM}$ falls below predefined value $V_x$. If this is the case, then the pump is assumed to be at rest (position 42). However, if pump voltage $u_{PM}$ continues to be greater than $V_x$, then the control is terminated and the control memory is reset according to FIG. 2f.

In an alternative embodiment of the present invention, provision is made for the pressure to be preferably measured upstream of the valve or to be estimated from the speed of the hydraulic pump. Preferably, the pump speed is determined at each calculation cycle.

What is claimed is:

1. A method for controlling a braking torque of a brake force regulator at at least one wheel of a motor vehicle, comprising the steps of:

causing a hydraulic pump to build up a brake pressure for a wheel brake cylinder in a hydraulic circuit;

causing a controller to perform a control of at least one valve in such a manner that, by opening and closing, the brake pressure is controlled as a function of one of a speed and a slip of a corresponding one of the at least one wheel;

causing the controller to calculate a control time for the at least one valve as a function of a pressure present in a line prior to a beginning of the control and of a speed of the hydraulic pump; and determining the pressure in the line via a coasting of the hydraulic pump subsequent to a switching off the control.

2. The method according to claim 1, further comprising the step of:

determining the speed of the hydraulic pump by measuring an induced voltage at a pump motor.

3. The method according to claim 1, further comprising the step of:

detecting a standstill of the hydraulic pump when a measured voltage falls below a predefined limit value.

4. The method according to claim 1, further comprising the step of:

determining the speed of the hydraulic pump for the calculation of the control time for the at least one valve.

5. A method for controlling a braking torque of a brake force regulator at at least one wheel of a motor vehicle, comprising the steps of:

causing a hydraulic pump to build up a brake pressure for a wheel brake cylinder in a hydraulic circuit;

causing a controller to perform a control of at least one valve in such a manner that, by opening and closing, the brake pressure is controlled as a function of one of a speed and a slip of a corresponding one of the at least one wheel;

causing the controller to calculate a control time for the at least one valve as a function of a pressure present in a line prior to a beginning of the control and of a speed of the hydraulic pump; and determining a pump standstill of the hydraulic pump for the calculation of the control time for the at least one valve.

6. A method for controlling a braking torque of a brake force regulator at at least one wheel of a motor vehicle, comprising the steps of:

causing a hydraulic pump to build up a brake pressure for a wheel brake cylinder in a hydraulic circuit;

causing a controller to perform a control of at least one valve in such a manner that, by opening and closing, the brake pressure is controlled as a function of one of a speed and a slip of a corresponding one of the at least one wheel;

causing the controller to calculate a control time for the at least one valve as a function of a pressure present in a line prior to a beginning of the control and of a speed of the hydraulic pump; and measuring a pump pressure, wherein the pump pressure is used as the pressure present in the line.

7. A method for controlling a braking torque of a brake force regulator at at least one wheel of a motor vehicle, comprising the steps of:

causing a hydraulic pump to build up a brake pressure for a wheel brake cylinder in a hydraulic circuit;

causing a controller to perform a control of at least one valve in such a manner that, by opening and closing, the brake pressure is controlled as a function of one of a speed and a slip of a corresponding one of the at least one wheel;

causing the controller to calculate a control time for the at least one valve as a function of a pressure present in a line prior to a beginning of the control and of a speed of the hydraulic pump; and estimating a pressure upstream of the at least one valve from the speed of the hydraulic pump, wherein the pressure upstream of the at least one valve is used as the pressure present in the line.

* * * * *